(No Model.)
W. R. CUNNINGHAM.
GOVERNOR.
No. 340,032. Patented Apr. 13, 1886.
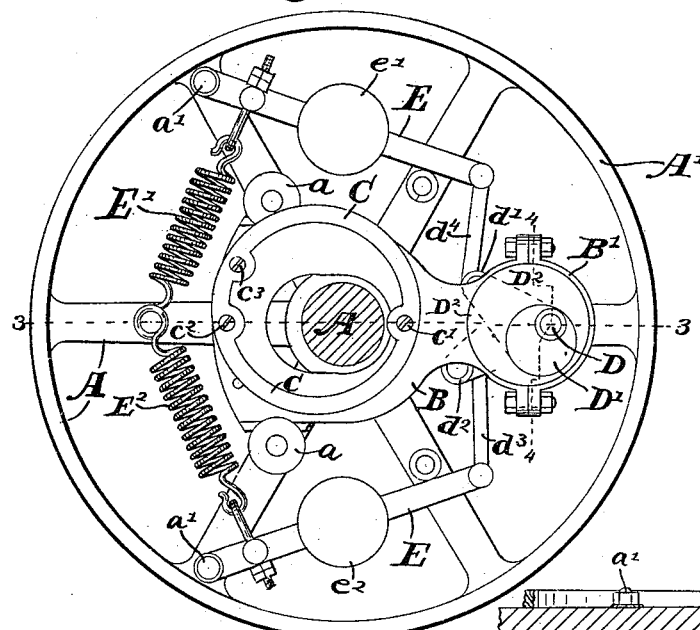
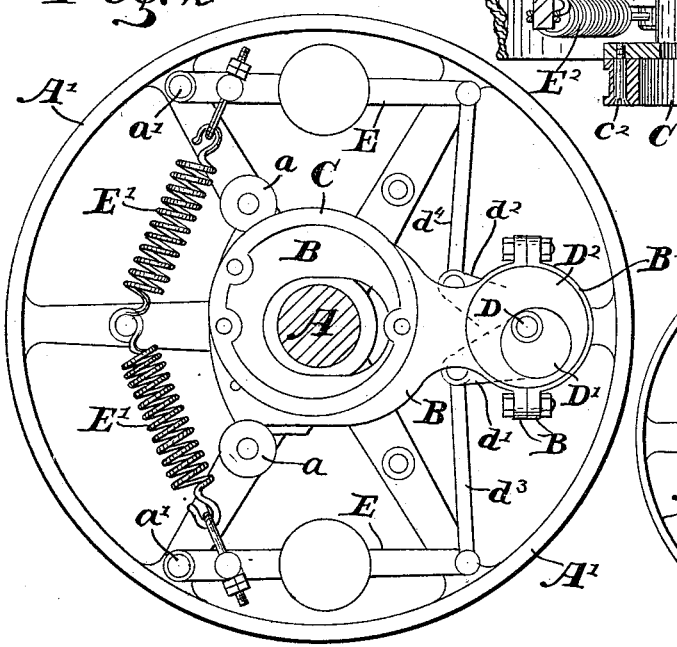
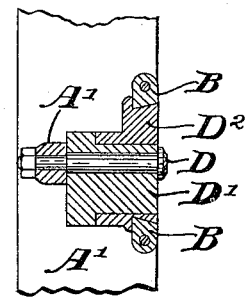
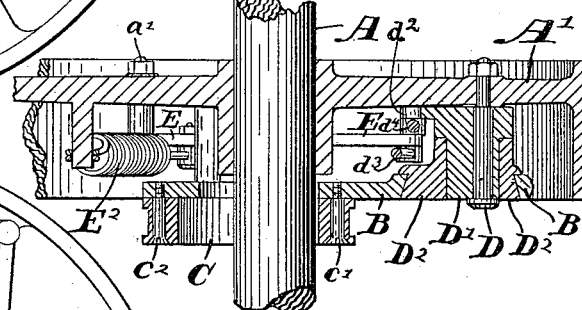
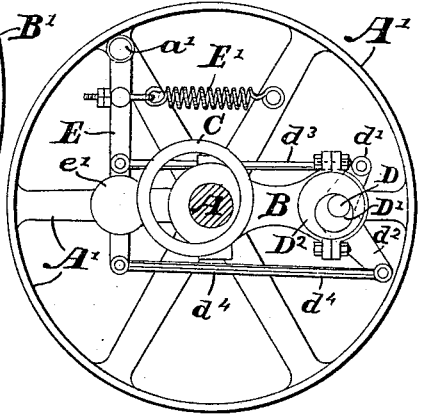
WITNESSES.
Chas. N. Leonard.
Charles L. Thurber
INVENTOR.
William R. Cunningham,
PER
C. Bradford,
ATTORNEY.
N. PETERS, Photo-Lithographer, Washington, D. C.

UNITED STATES PATENT OFFICE.

WILLIAM R. CUNNINGHAM, OF LAFAYETTE, INDIANA, ASSIGNOR OF ONE-HALF TO JOHN TEMPLE, OF SAME PLACE.

GOVERNOR.

SPECIFICATION forming part of Letters Patent No. 340,032, dated April 13, 1886.

Application filed February 2, 1886. Serial No. 190,578. (No model.)

*To all whom it may concern:*

Be it known that I, WILLIAM R. CUNNINGHAM, of the city of Lafayette, county of Tippecanoe, and State of Indiana, have invented certain new and useful Improvements in Governors, of which the following is a specification.

My said invention relates to that class of governors which are attached to a wheel on a crank-shaft; and it consists, first, in operating the reciprocating plate (on which a ring is mounted eccentrically to the center of the shaft) by means of an eccentric mounted on another eccentric, which is in turn mounted on a pin or stud-shaft secured to the wheel at a point to one side of the center; second, in the construction and mounting of said plate; third, in the mounting of said ring on said plate, whereby it may be adjusted so as to reverse the engine; and, fourth, in the arrangement of levers, springs, weights, and connecting-rods by which the eccentrics which operate the plate are operated.

Referring to the accompanying drawings, which are made a part hereof, and on which similar letters of reference indicate similar parts, Figure 1 is a side elevation of a wheel carrying a governor constructed according to my invention in position as when at rest; Fig. 2, a view similar to Fig. 1, illustrating the position which the parts assume when the governor is fully operated; Fig. 3, a central vertical sectional view, looking downwardly from the dotted line 2 2 in said Fig. 1; Fig. 4, a vertical sectional view through the two eccentrics which operate the plate, on the dotted line 4 4 in Fig. 1; and Fig. 5, a view illustrating a construction wherein a single pivoted arm, weight, and spring are used instead of two of each, as shown in the other views.

In said drawings, the portions marked A represent the main or crank shaft of an engine; B, the reciprocating plate; C, the eccentrically-set ring mounted on said plate; D, the stud-shaft or pin carrying the two eccentrics, and E pivoted arms carrying the weights.

The shaft A is the ordinary crank or main shaft of an engine, and carries the wheel A', which is usually the driving or fly wheel.

The plate B has an opening therein, which surrounds the shaft A and is supported at one end by bearings upon the wheel A'. These bearings are preferably grooved anti-friction rollers $a$, secured to the spokes of the wheel, as shown; and the edges of the plate are formed to fit into the grooves and move therein; but of course other suitable bearings might be readily suggested by any mechanic. At the other end the plate is supported and operated by the double eccentrics, as will be presently described. Bolt-holes are formed in this plate, by which the ring C may be secured thereto, and said holes are so arranged that said ring may be shifted, so as to reverse the engine, as will be presently more fully explained.

The ring C is secured to the plate B, preferably by three bolts, $c'$ $c^2$ $c^3$, one of which, $c'$, is located directly in the line between the center of the shaft A and the center of the stud-shaft or pin D. The other two are secured one, $c^2$, directly on the opposite side of the shaft A on a line passing through the center of said shaft and the first, and the other, $c^3$, at a point sufficiently above or below it so that when these bolts are removed and the ring swung down or up the central bolt will be changed to pass through the upper or lower hole, and the engine will be reversed thereby. The plate B is provided with holes corresponding to these several bolts, and with an additional hole to receive the other bolt when the position of the ring is changed on the plate. Of course, this adjustment may be effected with two bolts only, there being the proper number of holes; but I prefer, for the sake of rigidity and strength, to use three, as shown.

The pin or stud-shaft D is mounted on one of the spokes of the wheel, or at such other convenient point as may be desired, some distance to one side of the shaft A. One eccentric, D', is mounted thereon, and another eccentric, D², is mounted on the eccentric D', and over this last a strap or other connection, B', with the plate B is placed, so that when said eccentrics are revolved said plate will be moved back and forth. These eccentrics are provided with arms $d'$ $d^2$, respectively, as shown, and these arms are connected by means of links or rods $d^3$ and $d^4$ with the pivoted arms E.

The arms E are secured to the wheel A' by pivots $a'$, and extend from said pivots to a point substantially in line with the ends of the arms $d'$ $d^2$ of the eccentrics D' and $D^2$, where they are pivoted to the rods or links $d^3$ $d^4$, connecting with said arms. Springs E' and $E^2$ are provided, which hold said arms inwardly when not in operation, and with weights $e'$ $e^2$ adjustably mounted thereon, which operate, when the wheel is in motion, by means of the centrifugal force developed by such motion to force said arms outwardly, whereby, through the links or rods $d^3$ and $d^4$ and arms $d'$ $d^2$, the eccentrics D' and $D^2$ are operated, and thus move the plate B and the eccentrically-set ring thereon. As will be understood by an examination of the drawings, the operation of this double eccentric is to pull the plate B in a straight line, the movement of the inner eccentric counteracting the lateral movement of the outer eccentric, and thus the plate is moved directly back and forth, and not at all sidewise.

In Fig. 5 is illustrated a means of operating this double eccentric by means of a single pivoted lever with its attached spring and weight; but I prefer the construction shown in the other figures.

It will be understood, of course, that the eccentrically-set ring C on the plate B is the main eccentric by which the valve of an engine is operated, and that the valve-rod is connected to said eccentric in the usual and well-known manner. It will be further understood that the parts are so arranged as to operate to cut off the steam by means of said valve as the speed of the engine increases, all as is common.

Having thus fully described my said invention, what I claim as new, and desire to secure by Letters Patent, is—

1. The combination of the main shaft of an engine, a wheel thereon, a plate mounted in bearings on said wheel at one end and upon an eccentric, by which it is operated, at the other end, and carrying an adjustable ring thereon set eccentrically to said main shaft.

2. The combination, in a governor, of a plate mounted in bearings upon a wheel at one end and upon an eccentric at the other end, which is in turn mounted upon another eccentric, whereby, by the combined operation of said two eccentrics or double eccentric, said plate is moved in a direct line on its bearings, substantially as set forth.

3. The combination of a main or driving shaft, a wheel thereon, a slotted plate surrounding said shaft and mounted in bearings on said wheel at one end and upon a double eccentric mounted on a stud-shaft also on said wheel at the other end, and means of operating said double eccentrics, substantially as set forth.

4. The combination of the shaft A, the wheel A', the plate B, mounted in bearings on said wheel at one end, the double eccentric D' $D^2$, upon which said plate is mounted at the other end, pivoted arms carrying weights and held inwardly by springs, and connecting rods or links connecting said pivoted arms to arms on said eccentric or double eccentric, substantially as set forth.

5. The combination of the shaft A, the wheel A', having grooved rollers $a$ secured thereto, a plate, B, mounted and capable of being moved on said rollers, a stud-shaft, D, on said wheel, carrying a double eccentric, one portion of which is mounted upon the other, and a connection between said double eccentric and said plate, whereby, as said eccentric is operated, said plate will be moved in a direct line.

6. The combination, with a double eccentric for shifting the eccentric for driving a valve, of pivoted arms carrying weights and connections connecting said arms to said double eccentric, whereby said double eccentric will be operated by centrifugal force, substantially as set forth.

7. The combination of a shaft, A, wheel A', plate B, mounted in bearings on said wheel at one end and on a double eccentric at the other end, pivoted arms secured to said wheel at one end and connected to said double eccentric at the other end by means of rods or links, springs operating to hold said arms inwardly, and weights which tend, by means of centrifugal force, when the wheel is in motion, to force said arms outwardly, substantially as set forth.

In witness whereof I have hereunto set my hand and seal, at Indianapolis, Indiana, this 25th day of January, A. D. 1886.

WILLIAM R. CUNNINGHAM. [L. S.]

In presence of—
C. BRADFORD,
CHAS. L. THURBER.